(12) United States Patent
Shihoh

(10) Patent No.: US 8,737,829 B2
(45) Date of Patent: May 27, 2014

(54) CORRECTION OPTICAL DEVICE

(75) Inventor: Makoto Shihoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/324,904

(22) Filed: Dec. 13, 2011

(65) Prior Publication Data
US 2012/0154912 A1    Jun. 21, 2012

(30) Foreign Application Priority Data

Dec. 20, 2010   (JP) ................... 2010-283773

(51) Int. Cl.
*G03B 17/00* (2006.01)
(52) U.S. Cl.
USPC ................. 396/55; 348/208.11; 359/557
(58) Field of Classification Search
CPC ............. G03B 17/00; G03B 2217/00; G03B 2217/002; G03B 2217/005
USPC ................. 396/55; 348/208.11; 359/557
See application file for complete search history.

(56) References Cited

U.S. PATENT DOCUMENTS

| 7,755,666 | B2 | 7/2010 | Noji | |
|---|---|---|---|---|
| 2008/0291540 | A1* | 11/2008 | Nakamura et al. | 359/554 |
| 2009/0129764 | A1* | 5/2009 | Hayashi et al. | 396/55 |
| 2010/0157071 | A1* | 6/2010 | Lee | 348/208.2 |

FOREIGN PATENT DOCUMENTS

| JP | 10-221726 A | 8/1998 |
|---|---|---|
| JP | 3397536 B2 | 4/2003 |
| JP | 4011576 B2 | 11/2007 |
| JP | 2007-333850 A | 12/2007 |

* cited by examiner

*Primary Examiner* — WB Pery
*Assistant Examiner* — Fang-Chi Chang
(74) *Attorney, Agent, or Firm* — Canon USA Inc IP Division

(57) ABSTRACT

A correction optical device includes a rotating member that is disposed between a fixed member and a movable member that supports a compensation lens. By controlling rotation of the rotating member using the movable member, the movable member is locked and unlocked.

16 Claims, 10 Drawing Sheets

CORRECTION OPTICAL DEVICE

BACKGROUND OF THE INVENTION

1. Field of the Invention

The present invention relates to correction optical devices that correct image shake caused by shaking of optical devices, in particular, to a correction optical device equipped with a holding mechanism.

2. Description of the Related Art

Correction optical devices equipped with a correction optical system are known. The correction optical system prevents image shake by causing a compensation lens to perform a translational movement in a plane perpendicular to the optical axis. Some of the correction optical devices are equipped with a holding mechanism. This holding mechanism, when image shake correction is not performed, regulates movement of a movable portion and secures the movable portion that has the compensation lens.

For example, Japanese Patent No. 03397536 discloses a correction optical device. In this correction optical device, by rotating a lock ring 719, protrusions 75f of a supporting frame 75 of the compensation lens is engaged with an inner peripheral surface of the lock ring 719 in order to regulate movement of the compensation lens.

U.S. Pat. No. 7,755,666 discloses a correction optical device. In this correction optical device, when a movable member 14 having retaining portions 14a rotates to a specified position, the retaining portions 14a are engaged with engaging protrusion receiving portions 15a in order to retain the movable member 14. Thus, movement of the compensation lens is regulated.

According to Japanese Patent No. 03397536, in order to change the state of a movable portion including the compensation lens from a secured state to a movable state, that is, to a state in which correction is allowed, a driver that rotates the lock ring 719 is required. Furthermore, a separate actuator is required in order to hold the lock ring 719 in the state in which correction is allowed. This can increase the size and the cost of the device.

According to U.S. Pat. No. 7,755,666, a driver that causes the movable member 14 to rotate also drives a translational movement for image shake correction.

Today, there is a demand for optical devices such as, for example, digital still cameras and digital video cameras that have reduced sizes while realizing improved image quality. In order to meet this demand, alignment of axes, that is, adjustment of positions for alignment of optical axes is required in a section of an optical system having high sensitivity to eccentricity. In this adjustment, the optical axes of lenses are aligned with each other in order to eliminate eccentricity.

According to a method disclosed in U.S. Pat. No. 7,755,666, alignment of axes is performed so as to eliminate eccentricity. However, when image shake correction is not performed, the compensation lens is rotated. Thus, the optical axes having been aligned with each other are shifted from each other, and accordingly, image quality is degraded.

Furthermore, in order to switch the state of image shake correction from a correction state (a state in which the compensation lens is movable) to a non-correction state (a state in which the compensation lens is locked), it is required that an electrical current flow in drive coils. Thus, a manual switcher is provided for a case in which an electrical current cannot flow for a reason such as a battery has run out of power.

In a manual switching operation, according to the method disclosed in U.S. Pat. No. 7,755,666, it is required that a manual retaining member 52 be rotated to a specified position. However, when an operator has not fully rotated the manual retaining member 52, the compensation lens cannot be secured. In this state, if a large shock occurring at such a time as when the compensation lens falls off is applied to the correction optical device, the correction optical device may be damaged.

SUMMARY OF THE INVENTION

As a result of concentrated and diligent study in order to solve the above-described problems, the inventors herein have completed the present invention. According to the gist of the present invention, a correction optical device includes a fixed member, a correction optical system, a movable member that supports the correction optical system, and a driver arranged to cause the fixed member and the movable member to perform a translational movement or rotate relative to each other in a plane perpendicular to an optical axis of the correction optical system. The correction optical device also includes a rotating member that is supported such that the rotating member is rotatable relative to the fixed member in the plane, a contact member that is disposed in the fixed member in order to position the rotating member at a first position, an urging member that urges the rotating member such that the rotating member contacts the contact member, and a retainer arranged to retain the rotating member at a second position. In the correction optical device, a translational movement of the movable member is allowed when the rotating member is retained at the second position by the retainer, and the translational movement of the movable member is prohibited when retention due to the retainer is released and the rotating member moves to the first position.

With the correction optical device according to the present invention, drivers arranged to drive a compensation lens also drive a lock ring. Thus, a separate driver dedicated to locking is not desired. In addition, a need of rotating the compensation lens after a locking operation is almost eliminated. This can prevent image quality from being degraded because of a shift of the optical axis.

In addition, by slightly pushing a manual retaining member, the compensation lens can be reliably locked. Thus, the probability of damage caused by a large shock occurring at such a time as when the compensation lens falls off significantly decreases.

Further features of the present invention will become apparent from the following description of exemplary embodiments with reference to the attached drawings.

DESCRIPTION OF THE EMBODIMENTS

Embodiments according to the present invention will be described in detail below with reference to the accompanying drawings.

First Embodiment

A first embodiment according to the present invention will be described in detail below with reference to FIGS. 1 to 7.

Figure 7:
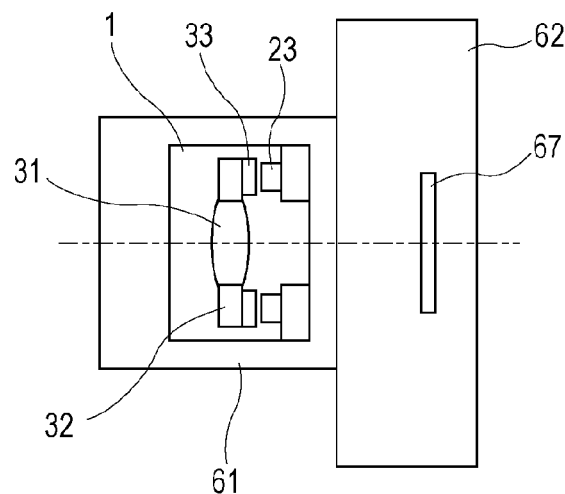
FIG. 7 is a sectional view of a camera as an image pickup apparatus according to the embodiment.

FIG. 7 is a sectional view of a camera as an image pickup apparatus according to the first embodiment of the present invention. The camera illustrated in FIG. 7 has a function of picking up movies and still images. The camera includes a lens barrel 61 and a camera body 62. The lens barrel 61 includes a correction optical device 1 therein. The correction optical device 1 includes a compensation lens 31, a moving plate 32, and a drive device. The moving plate 32 holds the compensation lens 31, and the drive device moves the moving plate 32. The drive device includes drive coils 23 and permanent magnets 33. The drive coils 23 are supported by a fixed portion of the correction optical device 1 and the permanent magnets 33 are supported by the moving plate 32.

The lens barrel 61 includes optical systems (not shown) other than the compensation lens 31, an acceleration sensor (not shown), and encoders (not shown). The acceleration sensor detects shaking of the lens barrel 61, and the encoders detect two-dimensional movement of the moving plate 32. In addition, a power source and a control portion are provided. The power source supplies electrical energy to the drive coils 23, and the control portion processes signals from the acceleration sensor and the encoder in order to operate the power source.

The camera body 62 includes an image pickup device 67 disposed therein. Light from an object is transmitted through the optical systems including the compensation lens 31 in the lens barrel 61 and incident upon the image pickup device 67 in the camera body 62. Image shake can be corrected by moving the compensation lens 31 using the correction optical device 1 in accordance with a signal from the acceleration sensor.

Figure 1:
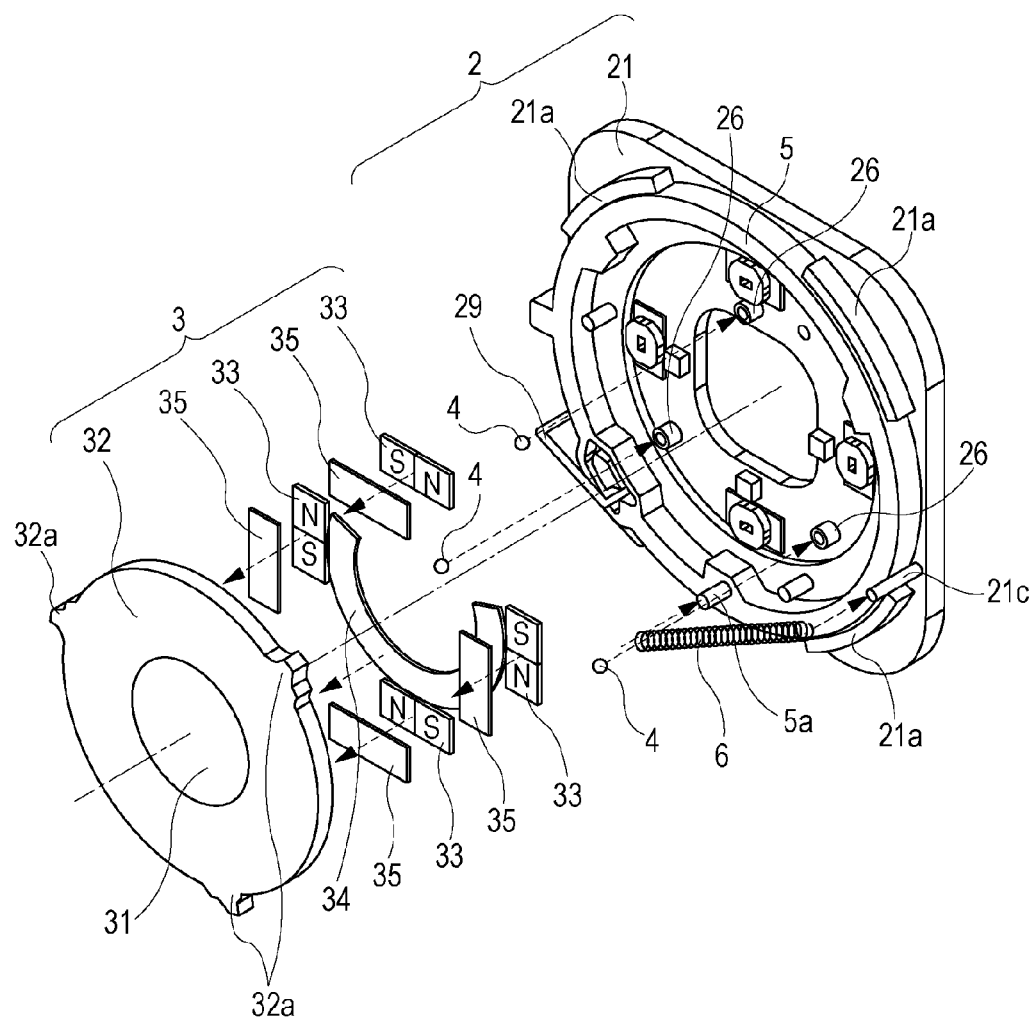
FIG. 1 is an exploded perspective view of a correction optical device according to an embodiment.

FIG. 1 is an exploded perspective view of the correction optical device 1 according to the first embodiment.

Referring to FIG. 1, the correction optical device 1 includes a fixed unit 2, a movable unit 3, and three balls 4. The fixed unit 2 serves as a fixed member that is secured together with a main body of an image taking lens (not shown), the movable unit 3 serves as a movable member that is provided with the compensation lens 31 and changes its position relative to the fixed unit 2, and the three balls 4 are disposed between the fixed unit 2 and the movable unit 3.

Figure 2:
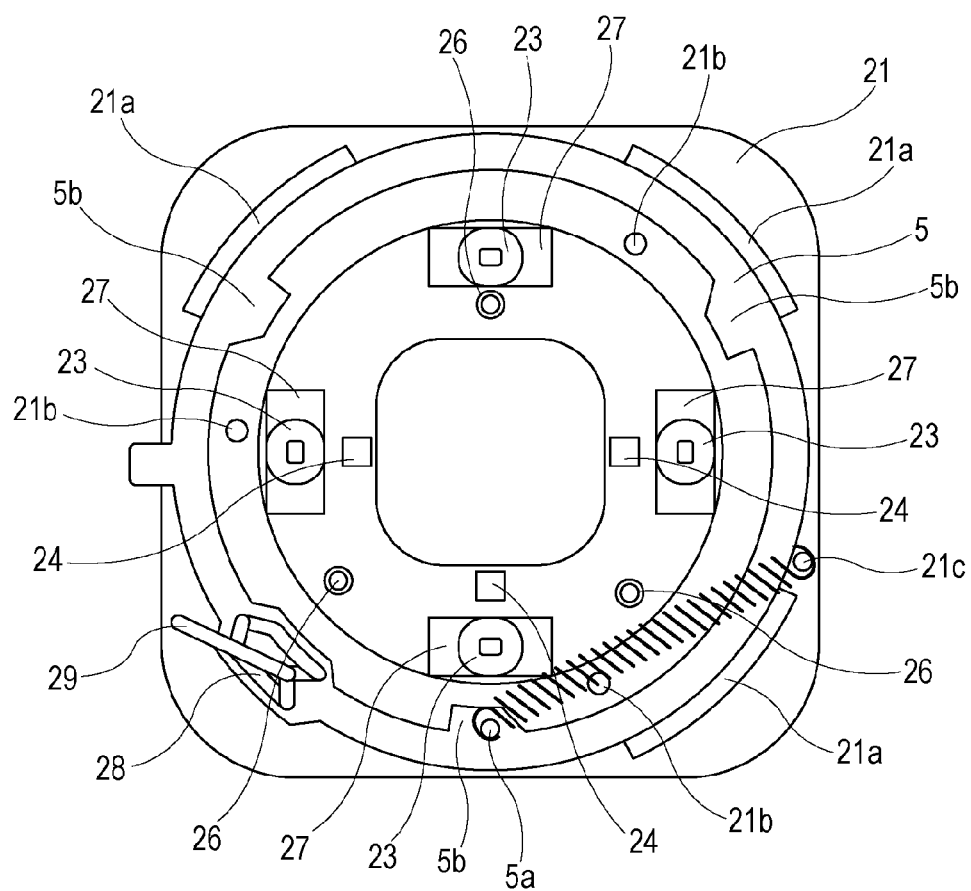
FIG. 2 is a plan view of a fixed unit according to the embodiment.

FIG. 2 is a front view of the fixed unit 2. The fixed unit 2 includes a holding plate 21, the four drive coils 23, and three encoders 24. The holding plate 21 serves as a base member, the drive coils 23 are secured to the holding plate 21 at positions spaced apart by about 90° in a rotational direction on the holding plate 21, and the encoders 24 detect the position of the movable unit 3. A rectangular yoke 27, which is formed of a magnetic material, is provided behind each drive coil 23, that is, on the holding plate 21 side of the drive coil 23.

Ball receiving portions 26 are provided so as to receive the three balls 4 that are disposed between the fixed unit 2 and the movable unit 3. The fixed unit 2 also includes a rotating ring 5. The rotating ring 5 serves as a rotating member and is supported by the holding plate 21 such that the rotating ring 5 is rotatable relative to the holding plate 21. Three rounded guide portions 21a, which guide the rotating ring 5, are provided in the holding plate 21. The holding plate 21 has three stopper pins 21b. The stopper pins 21b serves as contact members that contact the movable unit 3 so as to position the movable unit 3 (regulate the rotation of the movable unit 3) at a first position. The holding plate 21 also has a protrusion 21c. The protrusion 21c is used to hook one end of an extension spring 6 that serves as an urging member in order to urge the rotating ring 5 counterclockwise.

The rotating ring 5 has a protrusion 5a, to which the other end of the extension spring 6 is hooked, and three protruding portions 5b, which protrude radially inwardly. The rotating ring 5 has a substantially heart-shaped cam groove 28 (referred to as the heart-shaped cam groove 28 hereafter) formed therein. The holding plate 21 is provided with an elastic member 29. One end of the elastic member 29 is rotatably supported by (or secured to) the holding plate 21, and the other end, which is a free end, of the elastic member 29 is inserted into the heart-shaped cam groove 28. The elastic member 29 has a staple-like linear shape, and is urged such that the free end thereof that is inserted into the heart-shaped cam groove 28 constantly contacts a bottom portion of the heart-shaped cam groove 28. The heart-shaped cam groove 28 has a substantially uniform width, which is slightly larger than the diameter of the free end of the elastic member 29. In the present embodiment, the above-described heart-shaped cam groove 28 is used. However, according to the present invention, the shape of the cam groove is not necessarily a heart-like shape. The cam groove can be formed to have another polygonal shape, or the cam groove can have a shape part of which is curved. By using the loop-shaped cam groove (cam groove having a looped path of a specified shape) as used in the present embodiment, a regulated state and a released state can be effectively switched.

Figure 3A:
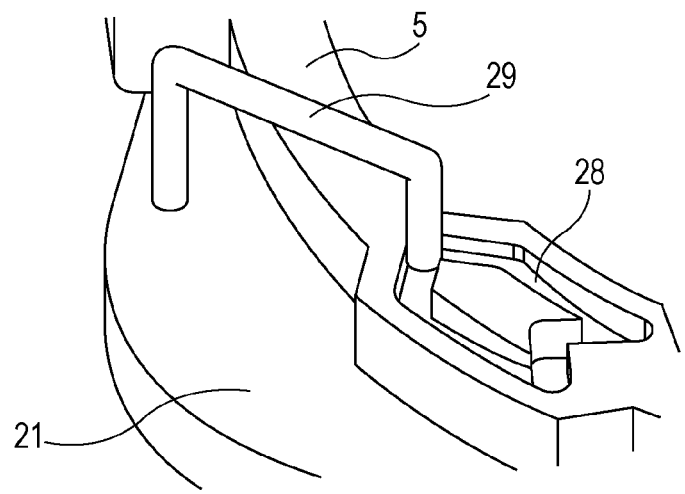
FIGS. 3A to 3C illustrate a cam mechanism according to the embodiment.
Figure 3B:
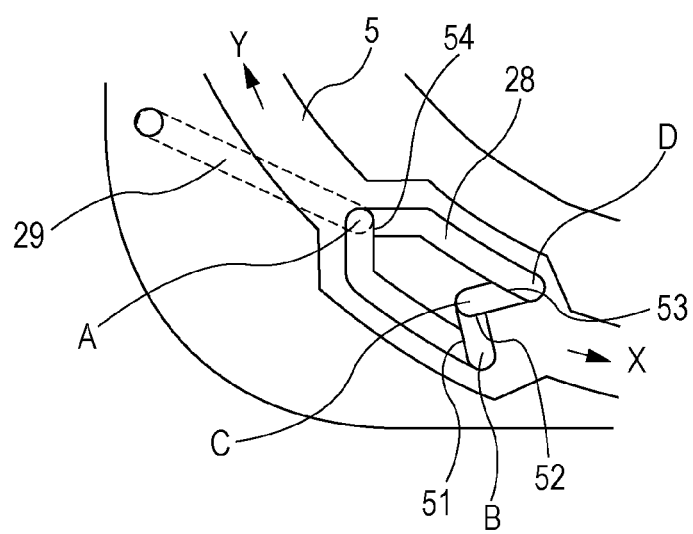
Figure 3C:
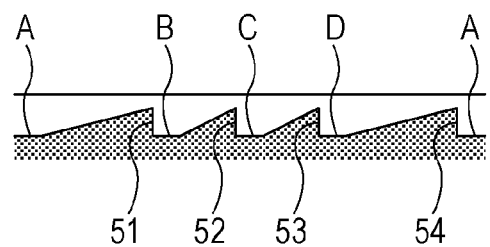

The shape of the heart-shaped cam groove 28 is described in detail with reference to FIGS. 3A to 3C. FIG. 3A is an enlarged perspective view illustrating the heart-shaped cam groove 28 and the elastic member 29, FIG. 3B is a plan view of the heart-shaped cam groove 28, and FIG. 3C is a schematic view illustrating the depth of a central portion of the heart-shaped cam groove 28.

In the heart-shaped cam groove 28, a portion A is one of the deepest portions. The depth of the heart-shaped cam groove 28 gradually decreases from the portion A toward a portion B. However, immediately before the portion B, a step 51 is formed, thereby making the depth of the portion B the same as that of the portion A. The depth of the heart-shaped cam groove 28 gradually decreases again from the portion B toward a portion C. However, immediately before the portion C, a step 52 is formed, thereby making the depth of the portion C the same as that of the portion A. Likewise, the depth from the portion C to a portion D and the depth from the portion D to the portion A gradually decrease and then increase because of the existence of the steps 53 and 54, respectively. Since the rotating ring 5 is pulled in an arrow X direction by the urging force of the extension spring 6, the rotating ring 5 is stopped in a state illustrated in FIGS. 3A and 3B. However, when the rotating ring 5 is rotated in an arrow Y direction, the free end of the elastic member 29 moves along a path extending from the portion A to the portion B in a range in which no step is formed, and then goes over the step 51 and drops into the portion B. Then, when a rotational drive force that rotates the rotating ring 5 in the arrow Y direction is stopped, the rotating ring 5 moves back in the arrow X direction due to the urging force of the extension spring 6. However, the free end of the elastic member 29 does not move back to the path to the portion A due to the existence of the step 51. Instead, the free end of the elastic member 29 moves to the portion C and the rotating ring 5 stops.

When the rotating ring 5 is rotated again in the arrow Y direction, the free end of the elastic member 29 moves along a path from the portion C toward the portion D in a range in which no step is formed, and then goes over the step 53 and falls into the portion D. Then, when the rotational drive force that rotates the rotating ring 5 in the arrow Y direction is stopped, the rotating ring 5 moves back in the arrow X direction due to the urging force of the extension spring 6. However, the free end of the elastic member 29 does not move back to the path to the portion C due to the existence of the step 53. Instead, the free end of the elastic member 29 moves to the portion A and the rotating ring 5 stops.

As described above, when the heart-shaped cam groove 28 and the elastic member 29 are used, the rotation of the rotating ring 5 in the arrow Y direction by a specified angle can cause the free end of the elastic member 29 to reciprocate between two positions, that is, a position where the free end of the elastic member 29 is fitted into the portion A and another position where the free end of the elastic member 29 is fitted into portion C in a movement of the free end of the elastic member 29 sequentially through the portions A, B, C, and D.

The movable unit 3 includes the moving plate 32 and the permanent magnets 33. The non-magnetic moving plate 32 holds the compensation lens 31 that serves as a correction optical system that corrects image shake. The permanent magnets 33 each have a rectangular shape and are disposed so as to oppose a corresponding one of the drive coils 23 of the fixed unit 2. Back yokes 35 are provided behind the respective permanent magnets 33, that is, on the moving plate 32 side of the respective permanent magnets 33. The back yokes 35 are used to form closed magnetic circuits. The moving plate 32 has protrusions 32a that protrude radially outwardly. The movable unit 3 includes a sector-shaped encoder scale 34 that is disposed at a position opposite the encoders 24. The permanent magnets 33 and the encoder scale 34 are moved together with the moving plate 32. As illustrated in FIG. 1, each permanent magnet 33 is magnetized such that one side and the other side of the center line of the permanent magnet 33 are respectively an S-pole and an N-pole. The permanent magnets 33 and the encoder scale 34 have sizes that are sufficiently large so that the permanent magnets 33 and the encoder scale 34 are able to oppose the drive coils 23 and the encoders 24 on the fixed unit 2 even when the movable unit 3 moves to the furthest position within the movable range.

With the structure as described above, the movable unit 3 is pulled to the fixed unit 2 due to the magnetic force of the permanent magnets 33 exerted on the yokes 27. The three balls 4 are interposed between the holding plate 21 and the moving plate 32 so as to be fitted into holes of the ball receiving portions 26 that are disposed in the holding plate 21. The balls 4 rotate in the holes of the ball receiving portions 26 as the moving plate 32 moves. By doing this, the moving plate 32 can be moved in a plane perpendicular to the optical axis as desired, and the moving plate 32 is supported so as to be positioned away from the holding plate 21 constantly by a certain distance.

Figure 4:
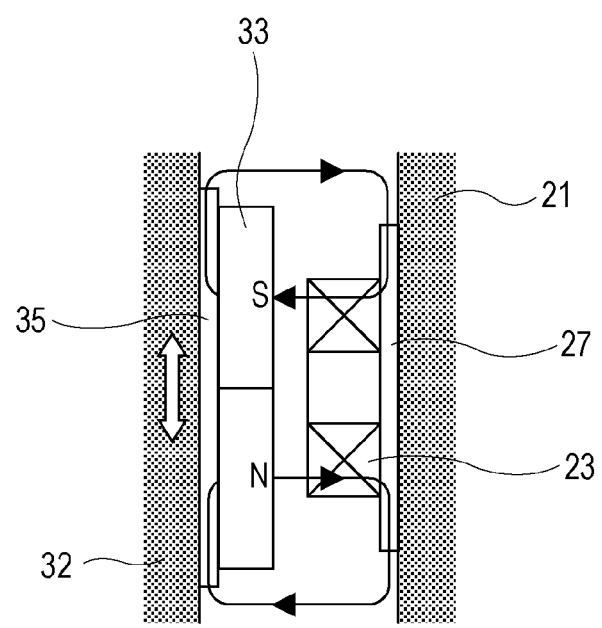
FIG. 4 is a sectional view of a driving portion and the structure around it according to the embodiment.

Next, a method of driving the movable unit 3 will be described. FIG. 4 is a sectional view of a driving portion and the structure around it. In FIG. 4, the center of the one of the drive coil 23 is aligned with the center line of the corresponding permanent magnet 33. The magnetic force of the permanent magnet 33 generates magnetic lines of force as indicated by arrows in FIG. 4. Thus, when a current flows in the drive coil 23 so as to generate a magnetic field from right to left in FIG. 4, a force that moves the movable unit 3 downward is generated. When a current flows in a reverse direction, a force that moves the movable unit 3 upward is generated. By separately applying a current to each of the four drive coils 23, the movable unit 3 performs translational and rotational movements in a plane perpendicular to the optical axis.

A method of controlling a lens drive unit in an image shake correction mode will be described below. In the image shake correction mode, the amount of image shake is input to a CPU for the lens drive unit (not shown) from a vibration detection sensor (not shown) of a camera or a lens body. The CPU calculates the amount of drive required in order for the correction optical system to correct image shake from the input amount of image shake, and outputs the drive amount in accordance with the calculated drive amount to each of the four drive coils 23 in the form of a drive signal. Each of the drive coils 23 generates a magnetic field in accordance with the received signal in order to cause the moving plate 32 to perform a translational move in a plane perpendicular to the optical axis. The three encoders 24 provided on the holding plate 21 read the encoder scale 34 in order to detect position information of the moving plate 32, and feedback the detected position information to the CPU. The CPU calculates the drive amount for the correction optical system in accordance with the fedback position information and the image shake amount that is newly received from the vibration detection sensor. Then the CPU outputs drive signals associated with the drive amount to the drive coils 23. By repeating the above-described operation, the lens drive unit continuously performs image shake correction.

A method of locking and unlocking the movable unit 3 will be described below with reference to FIGS. 5A to 6C. Switching of the state of image shake correction from an on state to an off state, which is a locked state of the movable unit 3, will be initially described.

Figure 5A:
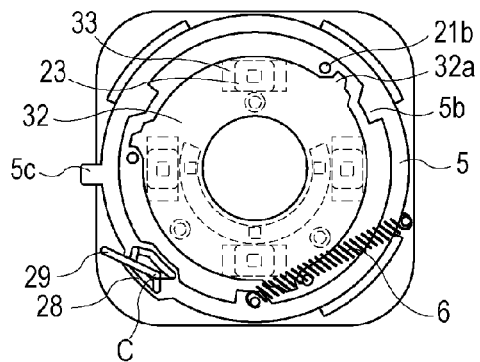
FIGS. 5A to 5E illustrate an operation in which the state of a movable unit is switched to a locked state according to the embodiment.
Figure 5D:
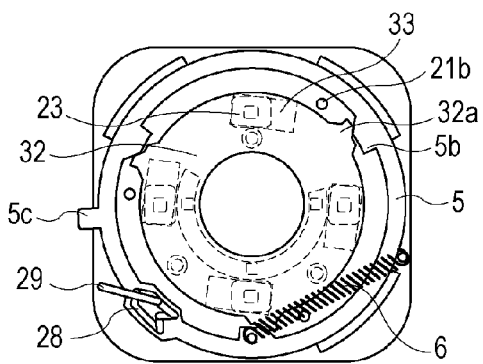

FIG. 5A illustrates the on state of image shake correction. In this state, the free end of the elastic member 29 is positioned at the portion C of the heart-shaped cam groove 28. At this time, the movable unit 3 contacts neither the rotating ring 5 nor the three stopper pins 21b. Thus, the movable unit 3 can perform translational and rotational movements in a plane perpendicular to the optical axis. At this time, the rotating ring 5 as the rotating member is positioned at a second position.

Figure 5B:
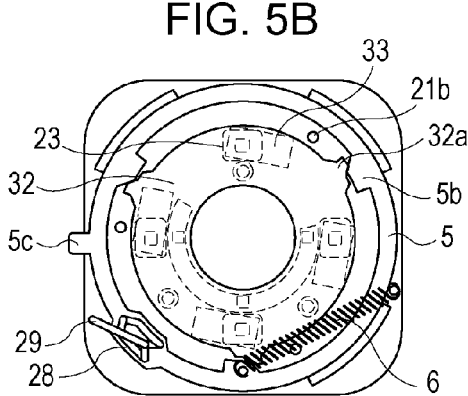
Figure 5E:
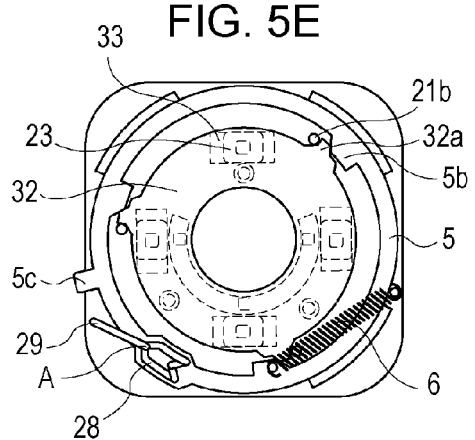
Figure 5C:
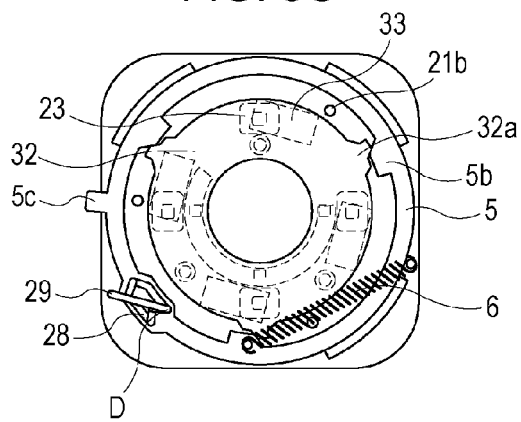

When the lens drive unit receives an image shake correction off signal from the camera or the lens, the CPU outputs the drive signals to the drive coils 23 so as to cause the center of the compensation lens 31 to be aligned with the optical axis. After that, the movable unit 3 is rotated clockwise. As illustrated in FIG. 5B, the protrusions 32a of the moving plate 32 contact the respective protruding portions 5b of the rotating ring 5. When the movable unit 3 is further rotated, the rotating ring 5 starts to rotate together with the movable unit 3, and, as illustrated in FIG. 5C, the free end of the elastic member 29 moves to the portion D of the heart-shaped cam groove 28. When the encoders 24 detect that the movable unit 3 has been rotated to this position, outputting of the drive signals to the drive coils 23 is stopped. As a result, the rotating ring 5 rotates counterclockwise due to the urging force of the extension spring 6. In so doing, the rotating ring 5 rotates together with the movable unit 3, and the free end of the elastic member 29 moves from the portion D in the heart-shaped cam groove 28 through a path illustrated in FIG. 5D. Then, as illustrated in FIG. 5E, when the protrusions 32a of the moving plate 32 contact the respective stopper pins 21b, both the movable unit 3 and the rotating ring 5 are stopped. In so doing, the free end of the elastic member 29 moves to the position of the portion A of the heart-shaped cam groove 28. When the three protrusions 32a of the moving plate 32 each contact a corresponding one of the stopper pins 21b, the center of the compensation lens 31 is aligned with the optical axis as illustrated in FIG. 5E. This state is maintained due to the urging force of the extension spring 6 exerted on the rotating ring 5 in the counterclockwise direction. Thus, the state of image shake correction is switched to the off state, which is the locked state of the movable unit 3. When the state of the movable unit 3 is switched to the locked state, translational and rotational movements of the movable unit 3 are prohibited. At this time, the rotating ring 5 as the rotating member is positioned at the first position.

Figure 6A:
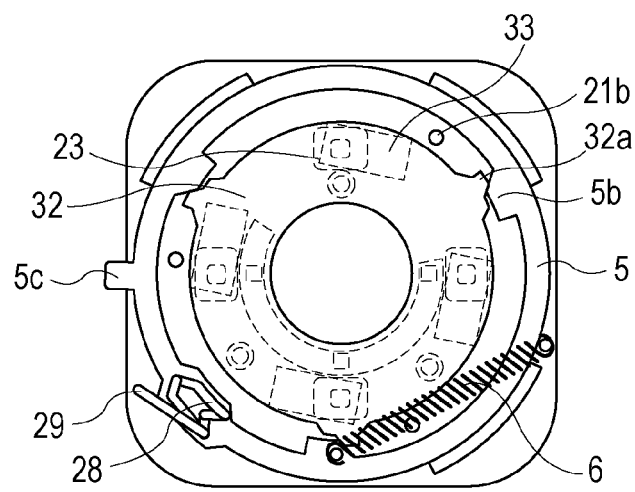
FIGS. 6A to 6C illustrate an operation in which the locked state of the movable unit is released according to the embodiment.
Figure 6B:
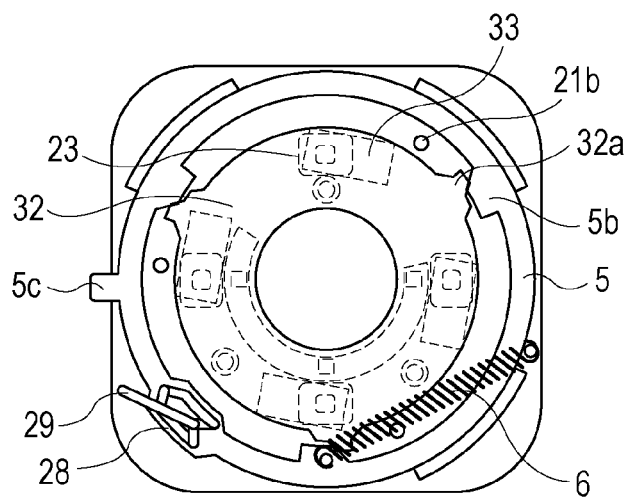
Figure 6C:
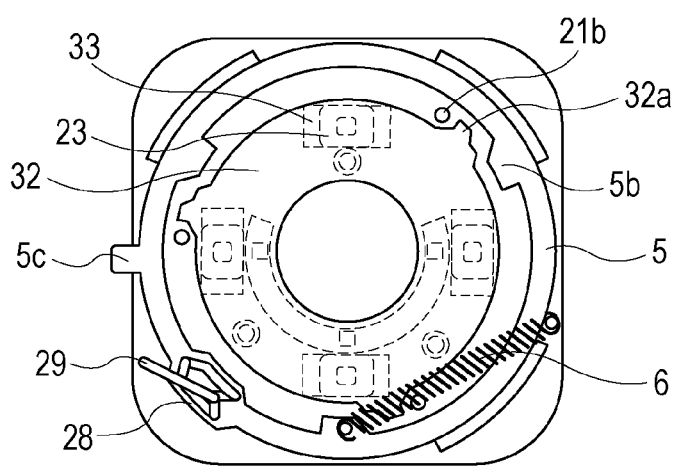

Referring to FIGS. 6A to 6C, a method of releasing the movable unit 3 from the locked state will be described. In order to release the movable unit 3 from the locked state and return to the image shake correction mode when the movable unit 3 is in the locked state as illustrated in FIG. 5E, the drive signals are output to the drive coils 23 in order to again rotate the movable unit 3 clockwise. In so doing, the moving plate 32 rotates together with the rotating ring 5. The free end of the elastic member 29 moves in a path from the portion A to the portion B in the heart-shaped cam groove 28 and reaches the portion B as illustrated in FIG. 6A. When the encoders 24 detect that the movable unit 3 has been rotated to this position, outputting of the drive signals to the drive coils 23 is stopped. As a result, the rotating ring 5 rotates counterclockwise due to the urging force of the extension spring 6. In so doing, the rotating ring 5 rotates together with the movable unit 3, and, as illustrated in FIG. 6B, the free end of the elastic member 29 moves from the portion B to the portion C in the heart-shaped cam groove 28. At the same time, when the drive signals are output to the drive coils 23 so as to rotate the movable unit 3 counterclockwise, the movable unit 3 rotates counterclockwise while the rotating ring 5 remains at the position illustrated in FIG. 6B. When the encoders 24 detect that the movable unit 3 has been rotated to the position illustrated in FIG. 6C, outputting of the drive signals to the drive coils 23 is stopped. Thus, the lens drive unit enters the image shake correction mode.

Next, a switcher arranged to manually switch the image shake correction state to the image shake correction off state, which is the locked state of the movable unit 3, will be described with reference to FIGS. 5A to 5E. In normal conditions, as described above, switching of the state of image shake correction can be performed by outputting the drive signals to the drive coils 23. The manual switcher is provided for a case in which the drive signals cannot be output for a reason such as a battery has run out of power.

In order to manually switch the state from the image shake correction state illustrated in FIG. 5A, a protrusion for manual switching 5c is pushed upward. As a result, the rotating ring 5 is rotated clockwise, thereby causing the free end of the elastic member 29 to move from the portion C to the portion D in the heart-shaped cam groove 28. When the free end of the elastic member 29 reaches the portion D, the rotating ring 5 cannot be further rotated. Thus, an operator recognizes that switching is complete through a change in a tactile sensation and removes her/his hand from the protrusion for manual switching 5c. As a result, the rotating ring 5 rotates counterclockwise due to the urging force of the extension spring 6. In so doing, the rotating ring 5 contacts the movable unit 3 and then rotates together with the movable unit 3, and the free end of the elastic member 29 moves from the portion D to the portion A in the heart-shaped cam groove 28. Thus, the state of image shake correction is switched to the off state illustrated in FIG. 5E, which is the locked state of the movable unit 3. When the state of the movable unit 3 is switched to the locked state, translational and rotational movements of the movable unit 3 are prohibited.

In the present embodiment, the heart-shaped cam groove 28 is formed in the rotating ring 5, and the one end of the elastic member 29 is secured to the holding plate 21. However, the similar structure can be obtained in a reversed manner, that is, the heart-shaped cam groove 28 is formed in the holding plate 21 and the one end of the elastic member 29 is secured to the rotating ring 5.

Alternatively, the diameter of the elastic member 29 can be formed to be smaller than the width of the heart-shaped cam groove 28. In this case, a cylindrical sleeve, one end of which is closed, can be inserted into an end of the elastic member 29 on the heart-shaped cam groove 28 side such that the sleeve is rotatable relative to the elastic member 29. By doing this, frictional resistance between the elastic member 29 and the heart-shaped cam groove 28 can be reduced.

With the above-described structure, drivers arranged to drive a compensation lens also drive rotation of a lock ring. Thus, a separate driver dedicated to locking is not required.

Rotation of the movable unit 3 between a position of the movable unit 3 in the image shake correction mode illustrated in FIG. 5A and a position of the movable unit 3 in the image shake correction off mode, which is the locked state of the movable unit 3 illustrated in FIG. 5E, is very small (1 to 3°, the amount of the rotation depends on a movable area for image shake correction). This can prevent image quality from being degraded because of a shift of the optical axis of the compensation lens 31.

In addition, by slightly pressing a manual retaining member, the compensation lens 31 can be reliably locked. Thus, the probability of damage caused by a large shock occurring at such a time as when the compensation lens 31 falls off significantly decreases.

Second Embodiment

A second embodiment according to the present invention will be described below with reference to FIGS. 8 to 10C.

Figure 8:
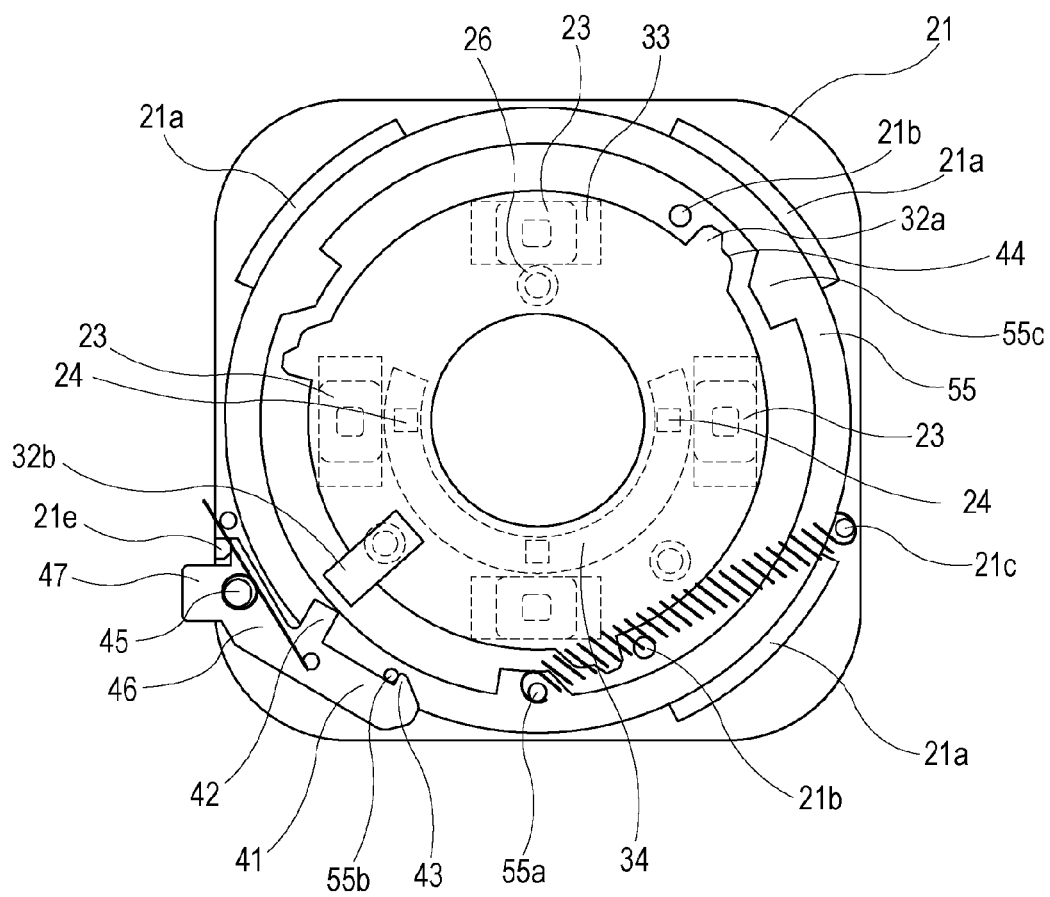
FIG. 8 is a plan view of a correction optical device according to another embodiment.

FIG. 8 is a plan view of the correction optical device 1 seen from the compensation lens side according to the second embodiment. Descriptions of components similar to those in the first embodiment are omitted.

In the first embodiment, the position of the rotating ring 5 is controlled using the heart-shaped cam groove 28 and the elastic member 29. In the second embodiment, the position of a rotating ring 55 is controlled using a retaining lever 41. The retaining lever 41 is pivotably supported about a rotation shaft 45, which is disposed in the holding plate 21, and urged counterclockwise using a torsion coil spring 46.

FIG. 8 illustrates a state in which image shake correction is in the on state. In this state, a retaining portion 43 of the retaining lever 41 retains a retaining post 55b of the rotating ring 55. Thus, the rotating ring 55 is held at a position illustrated in FIG. 8 against the urging force of the extension spring 6. A protrusion 32b is formed on the moving plate 32. When the moving plate 32 is moved and pushes a protrusion 42 of the retaining lever 41, retention of the retaining post 55b by the retaining portion 43 can be released.

The rotating ring 55 has three protrusions 55c that protrude radially inwardly. The moving plate 32 also has the protrusions 32a that radially outwardly protrude. Each protrusion 32a has a depression 44 that is engageable with one of the protrusions 55c. When the three protrusions 55c are each engaged with the depression 44, the movable unit 3 is positioned and the center of the compensation lens 31 is aligned with the optical axis. In the first embodiment, the three stopper pins 21b are provided in the holding plate 21. In the present embodiment, one stopper pin 21b is provided.

A method of locking and unlocking the movable unit 3 will be described below with reference to FIGS. 9A to 10C. A switching of the state of image shake correction from the on state to the off state, which is the locked state of the movable unit 3, will be initially described.

Figure 9A:
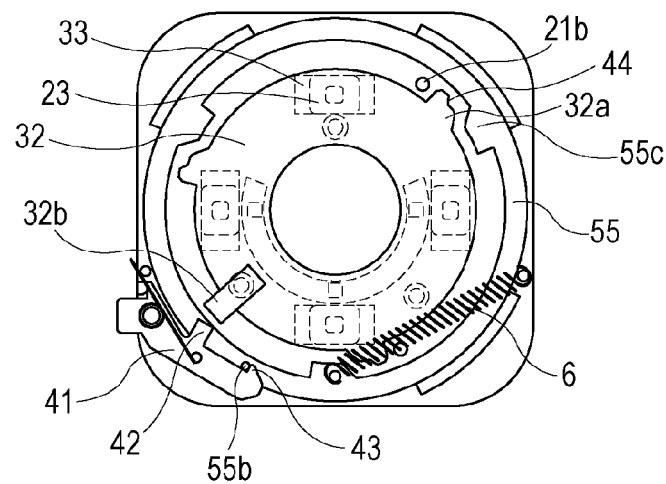
FIGS. 9A to 9C illustrate an operation in which the state of a movable unit is switched to a locked state according to the embodiment.

FIG. 9A illustrates a state in which image shake correction is in the on state. At this time, the movable unit 3 contacts neither the rotating ring 55 nor the stopper pin 21b. Thus, the movable unit 3 can perform translational and rotational movements in a plane perpendicular to the optical axis (second position).

Figure 9B:
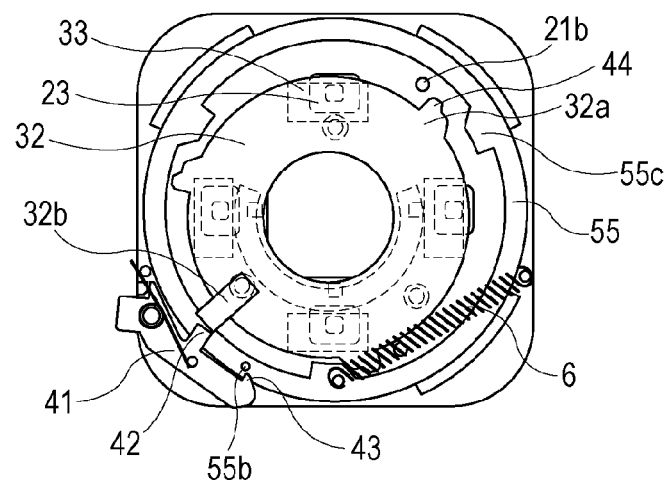
Figure 9C:
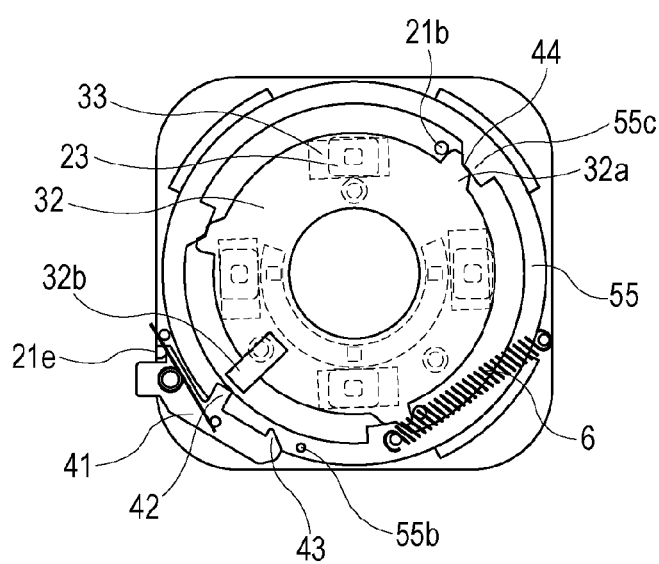

When the lens drive unit receives an image shake correction off signal from the camera or the lens, the CPU outputs the drive signals to the drive coils 23 so as to, as illustrated in FIG. 9B, cause the movable unit 3 to move toward the retaining lever 41 in order to press the protrusion 42 of the retaining lever 41 using the protrusion 32b. As a result, retention of the retaining post 55b by the retaining portion 43 of the retaining lever 41 is released. Thus, the rotating ring 55 is rotated counterclockwise due to the urging force of the extension spring 6. When the rotating ring 55 is rotated, the protrusions 55c are engaged with the depressions 44 of the moving plate 32, and the moving plate 32 is rotated counterclockwise, thereby bringing one of the protrusions 32a into contact with the stopper pin 21b (first position). As illustrated in FIG. 9C, this state is maintained due to the counterclockwise urging force of the extension spring 6 exerted on the rotating ring 55. Thus, the state of image shake correction is switched to the off state, which is the locked state of the movable unit 3. At this time, an end of the retaining lever 41 contacts a regulation member 21e of the holding plate 21, thereby regulating an excessive rotation of the retaining lever 41.

When the drive signals are output to the drive coils 23 in order to move the movable unit 3 to the center immediately after the retention of the retaining post 55b by the retaining portion 43 is released by pushing the protrusion 42 of the retaining lever 41 using the protrusion 32b, the state of the movable unit 3 can be more smoothly switched to the locked state.

Figure 10A:
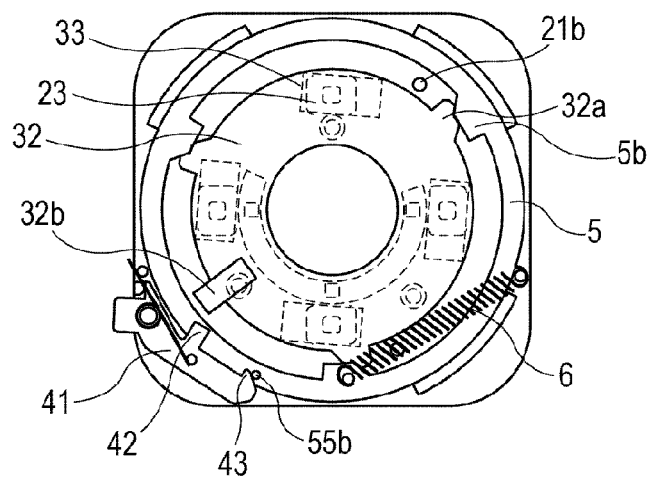
FIGS. 10A to 10C illustrate an operation in which the locked state of the movable unit is released according to the embodiment.
Figure 10B:
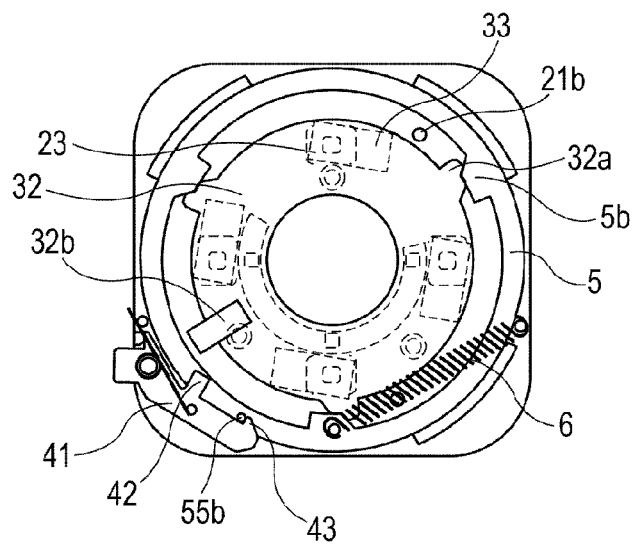
Figure 10C:
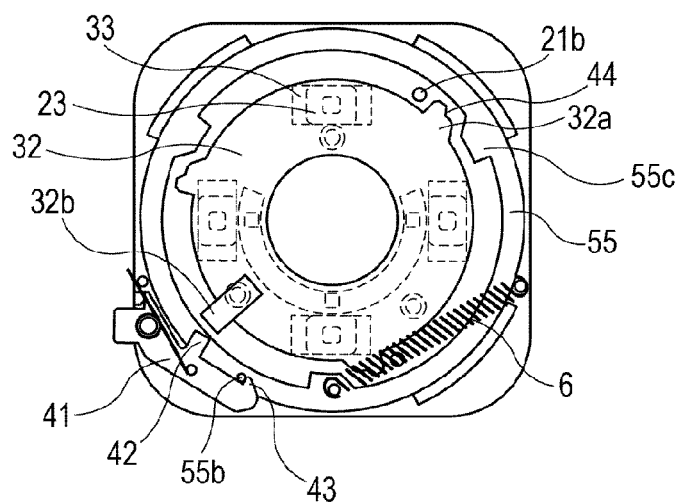

Referring to FIGS. 10A to 10C, a method of releasing the movable unit 3 from the locked state will be described. In order to release the movable unit 3 from the locked state and again return to the image shake correction mode, the drive signals are output to the drive coils 23 in the locked state of the movable unit 3 illustrated in FIG. 9C in order to again rotate the movable unit 3 clockwise. As a result, the moving plate 32 together with the rotating ring 55 rotates. When the moving plate 32 and the rotating ring 55 reach a position illustrated in FIG. 10A, the retaining post 55b of the rotating ring 55 contacts the retaining lever 41, thereby rotating the retaining lever 41 clockwise. When the movable unit 3 further rotates, as illustrated in FIG. 10B, the retaining post 55b is again engaged with the retaining portion 43 of the retaining lever 41. When the encoders 24 detect that the movable unit 3 has been rotated to the position illustrated in FIG. 10B, outputting of the drive signals to the drive coils 23 is stopped. After that, when the drive signals are output to the drive coils 23 so as to rotate the movable unit 3 counterclockwise, the movable unit 3 rotates counterclockwise while the rotating ring 55 remains at the position illustrated in FIG. 10B. When the encoders 24 detect that the movable unit 3 has been rotated to the position illustrated in FIG. 10C (second position), outputting of the drive signals to the drive coils 23 is stopped. Thus, the lens drive unit enters the image shake correction mode.

Next, the unit arranged to manually switch the image shake correction state to the image shake correction off state, which is the locked state of the movable unit 3, will be described with reference to FIG. 8. In normal conditions, as described above, switching of the state of image shake correction can be performed by outputting the drive signals to the drive coils 23. The manual switcher is provided for a case in which the drive signals cannot be output for a reason such as a battery has run out of power.

In order to manually switch the state from the image shake correction state illustrated in FIG. 8, a protrusion for manual switching 47 is pushed upward. As a result, the retaining lever 41 rotates clockwise, and accordingly, retention of the retaining post 55b by the retaining portion 43 of the retaining lever 41 is released. Thus, the rotating ring 55 is rotated counterclockwise due to the urging force of the extension spring 6. When the rotating ring 55 is rotated, the protrusions 55c are engaged with the depressions 44 of the moving plate 32, and the moving plate 32 is rotated counterclockwise, thereby bringing the protrusion 32a into contact with the stopper pin 21b. As illustrated in FIG. 9C, this state is maintained due to the urging force of the extension spring 6 exerted on the rotating ring 55 in the counterclockwise direction. Thus, the state of image shake correction is switched to the off state, which is the locked state of the movable unit 3 (first position).

In the first embodiment, in order to switch the state of image shake correction from the on state to the off state, which is the locked state of the movable unit 3, the movable unit 3 is initially rotated clockwise and then rotated in the opposite direction so as to be returned to a position that is substantially the same position where the movable unit 3 existed before it was rotated. With the structure according to the second embodiment, the rotation of the movable unit 3 is substantially eliminated. This can prevent image quality from being degraded due to a shift of the optical axis of the compensation lens 31 also when the state of image shake correction is switched.

Third Embodiment

In a third embodiment, an example having drivers that are different from those in the first and second embodiment will be described with reference to FIG. 11. In the first and second embodiments, so-called voice coil motors, which use the drive coils 23 and the permanent magnets 33, are used for the drivers. In the third embodiment, vibration wave motors, which serve as a driver arranged to drive a vibration wave, are used instead of the voice coil motors.

Figure 11:
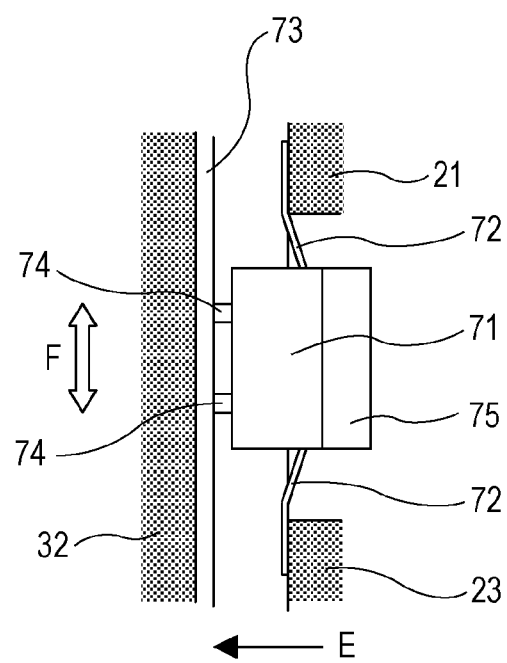
FIG. 11 is a sectional view of a driving portion and the structure around it according to another embodiment.

FIG. 11 is a sectional view of one of four vibration wave motors 71 and the structure around it. In a supporting relationship between the fixed unit 2 and the movable unit 3, the vibration wave motor 71 is supported by the holding plate 21, which serves as a supporting member, using thin plate springs 72, and contacts a friction plate 73 that is secured to the moving plate 32. The thin plate springs 72 each has flexibility in an arrow E direction, and high stiffness in two directions that are perpendicular to the arrow E direction. A permanent magnet 75 is provided on a side opposite the friction plate 73 side of the vibration wave motor 71. The friction plate 73 is formed of a magnetic material. Two contact portions 74 disposed on the vibration wave motor 71 contact the friction plate 73 due to the urging force constantly exerted in the arrow E direction in FIG. 11 as a result of the attractive force of the friction plate 73 and the permanent magnet 75. In the contact portions 74 of a vibrator of the vibration wave motor 71, two vibration modes are excited by driving a piezoelectric ceramic (not shown), which serves as an electromechanical energy conversion element. One of the modes is a thrusting mode in which vibration is generated in a thrusting direction (the arrow E direction in FIG. 11), and the other mode is a sliding mode in which vibration is generated in sliding directions (the arrow F directions in FIG. 11). By combining these two vibration modes, an elliptical motion is generated in the contact portions 74, thereby transferring a drive force in the arrow F directions to the friction plate 73.

Each of the four vibration wave motors 71 separately performs the above-described vibrational movement, thereby causing the moving plate 32 serving as a moving body to perform translational and rotational movements in a plane perpendicular to the optical axis.

When the vibration wave motors 71 are not operated, unlike the case where the voice coil motors are used, a holding force is applied so as to prevent the movable unit 3 from moving due to a static frictional force that constantly acts between the contact portions 74 and the respective friction plates 73.

In the image shake correction off state, which is the locked state of the movable unit 3, mechanical looseness of engagement cannot be completely prevented from occurring between the holding plate 21 and the rotating ring 5 or 55, between the rotating ring 5 or 55 and the moving plate 32, and between the holding plate 21 and the moving plate 32. In a case in which the voice coil motors are used, the compensation lens 31 moves by the amount of the looseness. When the vibration wave motors 71 are used, the above-described holding force prevents the compensation lens 31 from being moved by the amount of the looseness.

The above-described holding force can be canceled when the vibration wave motors 71 are driven such that only the thrust up mode is enabled. By doing this, the movable unit 3 can be moved with a small force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283773 filed Dec. 20, 2010, which is hereby incorporated by reference herein in its entirety.

What is claimed is:

1. A correction optical device comprising:
a fixed member;
a correction optical system;
a movable member that supports the correction optical system;
a driver arranged to cause the fixed member and the movable member to translate or rotate relative to each other in a plane perpendicular to an optical axis of the correction optical system;
a rotating member that is supported such that the rotating member is rotatable relative to the fixed member in the plane;
a contact member disposed in the fixed member to position the rotating member at a first position;
an urging member that urges the rotating member such that the rotating member contacts the contact member; and
a retainer arranged to retain the rotating member at a second position,
wherein, when the rotating member is retained at the second position by the retainer, a translational movement of the movable member is allowed,
wherein, when retention due to the retainer is released and the rotating member moves to the first position, the translational movement of the movable member is prohibited, and
wherein the retainer comprises a cam groove and an elastic member, the cam groove being formed in the rotating member, one end of the elastic member being rotatably supported by or secured to the fixed member, and the other end of the elastic member being inserted into the cam groove.

2. The correction optical device according to claim 1, wherein, when the retainer is released, the retainer retains the rotating member by a rotation of the rotating member using the driver or by a manual rotation of the rotating member.

3. The correction optical device according to claim 1, wherein, when the translational movement of the movable member is allowed, the retention due to the retainer is released by a rotation of the rotating member using the driver, or by a manual rotation of the rotating member.

4. The correction optical device according to claim 1, wherein the rotating member is caused to reciprocate between the first and second positions through movement of the other end of the elastic member in the cam groove.

5. The correction optical device according to claim 1, wherein the driver includes a vibration wave driver, the vibration wave driver including a vibrator that has an electromechanical energy conversion element, and a supporting member that supports the vibrator, wherein the vibration wave driver excites vibration in the vibrator causing a moving body to move due to a frictional force, the moving body contacting the vibrator.

6. The correction optical device according to claim 1, wherein the driver includes a voice coil motor.

7. A lens barrel comprising the correction optical device according to claim 1, an acceleration sensor, and an encoder.

8. An image pickup apparatus comprising the lens barrel according to claim 7, a camera body, and an image pickup device.

9. A correction optical device comprising:
a fixed member;
a correction optical system;
a movable member that supports the correction optical system;
a driver arranged to cause the fixed member and the movable member to translate or rotate relative to each other in a plane perpendicular to an optical axis of the correction optical system;
a rotating member that is supported such that the rotating member is rotatable relative to the fixed member in the plane;
a contact member disposed in the fixed member to position the rotating member at a first position;
an urging member that urges the rotating member such that the rotating member contacts the contact member; and
a retainer arranged to retain the rotating member at a second position,
wherein, when the rotating member is retained at the second position by the retainer, a translational movement of the movable member is allowed,
wherein, when retention due to the retainer is released and the rotating member moves to the first position, the translational movement of the movable member is prohibited, and wherein the retainer comprises a cam groove and an elastic member, the cam groove being formed in the fixed member, one end of the elastic member being rotatably supported by or secured to the rotating member, and the other end of the elastic member being inserted into the cam groove.

10. The correction optical device according to claim 9, wherein, when the retainer is released, the retainer retains the rotating member by a rotation of the rotating member using the driver or by a manual rotation of the rotating member.

11. The correction optical device according to claim 9, wherein, when the translational movement of the movable member is allowed, the retention due to the retainer is released by a rotation of the rotating member using the driver, or by a manual rotation of the rotating member.

12. The correction optical device according to claim 9, wherein the rotating member is caused to reciprocate between the first and second positions through movement of the other end of the elastic member in the cam groove.

13. The correction optical device according to claim 9, wherein the driver includes a vibration wave driver, the vibration wave driver including a vibrator that has an electromechanical energy conversion element, and a supporting member that supports the vibrator, wherein the vibration wave driver excites vibration in the vibrator causing a moving body to move due to a frictional force, the moving body contacting the vibrator.

14. The correction optical device according to claim 9, wherein the driver includes a voice coil motor.

15. A lens barrel comprising the correction optical device according to claim 9, an acceleration sensor, and an encoder.

16. An image pickup apparatus comprising the lens barrel according to claim 15, a camera body, and an image pickup device.

* * * * *